US012108715B2

(12) United States Patent
Vanwingerden

(10) Patent No.: US 12,108,715 B2
(45) Date of Patent: Oct. 8, 2024

(54) MULTI-PIECE SUPPORT PLUG

(71) Applicant: Jason Vanwingerden, Stuarts Draft, VA (US)

(72) Inventor: Jason Vanwingerden, Stuarts Draft, VA (US)

(73) Assignee: The Plant Company of Virginia, LLC, Stuarts Draft, VA (US)

( * ) Notice: Subject to any disclaimer, the term of this patent is extended or adjusted under 35 U.S.C. 154(b) by 144 days.

(21) Appl. No.: 17/655,674

(22) Filed: Mar. 21, 2022

(65) Prior Publication Data
US 2023/0292674 A1    Sep. 21, 2023

(51) Int. Cl.
*A01G 9/029*    (2018.01)
*A01G 9/00*    (2018.01)
*A01G 9/02*    (2018.01)

(52) U.S. Cl.
CPC .............. *A01G 9/021* (2013.01); *A01G 9/029* (2018.02)

(58) Field of Classification Search
CPC ...... A01G 9/021; A01G 9/029; A01G 9/0293; A01G 5/02; A01G 9/00; A01G 2009/003; A01G 9/0295; B65D 43/021; B65D 39/0052; B65D 39/00; B65D 2543/00546; B65D 39/0058; B65D 39/007; A47G 7/00; A47G 7/07; A47G 13/0212; A47G 33/12; A47G 2033/123; A47G 7/02
See application file for complete search history.

(56) References Cited

U.S. PATENT DOCUMENTS 3,984,941 A * 10/1976 Chetta, Jr. ................. B65F 1/14
                                                          428/34.1
D445,358 S * 7/2001 Simmons ..................... D11/152
(Continued)

FOREIGN PATENT DOCUMENTS

CA          2259482 A1 * 8/2000   ......... A01G 13/0281
DE          839907 C       5/1952
(Continued)

OTHER PUBLICATIONS

Webpage printout from: https://www.instagram.com/p/ByR8FI0HZ1G/—showing Jun. 4, 2019, printed Jan. 23, 2024, showing a one piece cork plant holder.
(Continued)

*Primary Examiner* — Kristen C Hayes
(74) *Attorney, Agent, or Firm* — Tuggle Duggins P.A.; Reinier R. Smit; Blake P. Hurt

(57) ABSTRACT

A system and device used to substantially plug a mouth of a vessel to inhibit an article from cresting above the mouth and spilling outside the vessel and to retain a portion of the article within the vessel without damaging the article. The plug includes a first plug piece and a second plug device, which are positioned adjacent and contacting each other to form a plug body forming a plug channel. An indentation is disposed on the periphery of the plug body to correspond to and engage with a lip defining the mouth. The plug is supported by and rests within the mouth of a vessel such that a top portion of the plug rests extending above the mouth and a bottom portion of the plug rests extending below the mouth. When the indentation engages the lip, upper surfaces of the plug pieces may rest coplanar.

12 Claims, 9 Drawing Sheets

(56) References Cited

U.S. PATENT DOCUMENTS

| | | | | |
|---|---|---|---|---|
| 6,457,276 | B1* | 10/2002 | Masters | A47G 7/07 47/41.01 |
| 6,918,207 | B2* | 7/2005 | Dai | A01G 31/02 47/81 |
| 7,310,909 | B2* | 12/2007 | Broel | A47G 7/02 47/41.13 |
| 8,196,530 | B1* | 6/2012 | Van Dyk | A47G 33/12 312/262 |
| 9,657,491 | B1* | 5/2017 | Mansueto | A47G 33/12 |
| 2013/0270398 | A1* | 10/2013 | Radermacher | A47G 7/07 29/451 |
| 2020/0323366 | A1* | 10/2020 | Luk | A01G 5/04 |

FOREIGN PATENT DOCUMENTS

| | | | | |
|---|---|---|---|---|
| EP | 2014566 | A1 | 1/2009 | |
| EP | 2572571 | A1 * | 3/2013 | A01G 9/1026 |
| GB | 2409201 | A | 6/2005 | |
| GB | 2415691 | A | 1/2006 | |

OTHER PUBLICATIONS

Webpage printout from: https://www.instagram.com/p/B3wcYnzFla0/—dated Oct. 18, 2019, printed Jan. 23, 2024, showing a one piece cork plant holder with a slit on one side.

Webpage printout from: https://www.youtube.com/watch?v=h-mTQR2j4SE—dated Jan. 16, 2020, image printed Jan. 23, 2024—video title: "Glazen Tulp 2020—de finalisten in de categorie Concepten", Google translation of title: "Glass Tulip 2020—the finalists in the Concepts category", showing a corked plant in a vase.

Webpage printout from: https://www.amazon.com/Terrariums-Hydroponic-Propagation-Containers-Decorations/dp/B09KBVQ5JS/ref=sr_1_2?crid=CP0CXU1EXZOC&keywords=hejian+planter+terrariums+hydroponic+glass+vases&qid=1705529936&sprefix=hejian+planter+terrariums+hydroponic+glass+vases%2Caps%2C71&sr=8-2—undated, printed Jan. 23, 2024, showing a "Planter Terrariums Hydroponic Glass Vases Propagation Station Containers with Lids and Stands for Indoor Plants and Cuttings Desktop Decorations for Office Home Gifts".

Webpage printout from: https://www.alibaba.com/product-detail/Customized-Clear-Glass-Bottle-Jar-Hydroponic_62472737121.html?spm=a2700.pccps_detail.0.0.51b913a0GXmMIf—showing a Customized Clear Glass Bottle Jar Hydroponic Terrarium with Color Changing LED Light Cork Lid, undated, printed Jan. 23, 2024.

Webpage printout from: https://www.amazon.com/dp/B092DDMDNS?ref_=cm_sw_r_cp_ud_dp_JZ8A0QSTYVM8T5B2NSEW—undated, printed Jan. 23, 2024, showing "FuTaiKang Desktop Plant Terrarium Propagation Station Tabletop Glass Planter Water Planting Glass Vase with Lid for Growing Hydroponic Plants Home Office Table Decoration".

Webpage printout from: https://scoutlife.org/hobbies-projects/funstuff/4406/growing-plants-without-dirt/—undated, printed Jan. 23, 2024, title: How to start a hydroponic garden, by E. MacLean Crane, with comments dating back to Jan. 2013, showing a "cork stopper with a large hole in the middle".

Webpage printout from: https://www.intenz.me/products/syngonium-pixie—undated, printed Jan. 23, 2024, showing a one piece ungrooved cork plant holder with a slit on one side.

Webpage printout from: https://www.intenz.me/products/philodendron-white-wave-mangrove—undated, printed Jan. 23, 2024, showing a one piece ungrooved cork plant holder with a slit on one side.

* cited by examiner

MULTI-PIECE SUPPORT PLUG

FIELD OF THE INVENTION

The disclosure herein pertains to support plugs generally, and particularly pertains to a two-piece plug for supporting articles and for substantially plugging a mouth of a vessel, so contents placed within the vessel are retained and substantially inhibited from spilling above the mouth and out of the vessel.

DESCRIPTION OF THE PRIOR ART AND OBJECTIVES OF THE INVENTION

For many articles, especially living articles such as plants, it is often advantageous that the articles are sufficiently supported and retained within a vessel, throughout production, transportation, and display of the article. Various devices are commonly used to support and retain an article within a vessel, such as soil substrates, soilless substrates for instance rocks, partition supports, stakes, trays, lids, and other devices that serve similar functions. Existing devices used to support plants, for example, within a vessel typically support a lower portion of the plant, utilizing the natural root system of the plant. The root system of a plant constantly provides the stems and leaves with the nutrients requires for healthy growth. Existing devices and methods for supporting an article, however, often obstruct the view of the lower portion of the article, in particular the root system, which is a focal point for consumers purchasing plants.

For certain articles, such as plants, a portion of the article may extend through and above the mouth of the vessel during production, transportation, and display of the article. In this situation, retaining and supporting the article upright throughout the lifespan of the article is a key challenge that must be overcome. During the early stages of the lifespan of a plant, it is very advantageous to the overall health of the plant that the plant is supported upright. Supporting a plant upright during the early stages of the lifespan of the plant allows the plant to focus its energy on producing healthier (e.g., larger, stronger, and more colorful) flowers, rather than focusing energy on maintaining an upright orientation on its own by strengthening the shoots of the plant. As used herein, the term "upright" means vertical in relation to the horizon or the flat surface the article is placed on.

It is also advantageous to retain and support an article during transportation. Because articles are subjected to various unpredictable forces during transportation, a device that can accommodate the unpredictable forces the article faces during transportation must be used to support and retain a living article within a vessel during transportation. Some articles, such as living plants, typically require a nutrient solution throughout the lifetime of the plant; therefore, a device able to accommodate and substantially inhibit the nutrient solution from splashing above the mouth and spilling out of the vessel is desirable. A nutrient solution may be any type of solution that provides nutritional value often required for plant growth, including but not limited to, water, plant growth hormones, plant growth regulators, or any other nutritional supplement, alone or in combination.

In the final stages of the lifespan of an article, particularly marketing and display, the ability to view the article without obstruction caused by the vessel or other support devices is another important consideration that directly affects the value of the article to be sold. Visibility of certain portions of the article can increase the value of the article, making it easier to market and sell. For certain living articles such as plants, for example, the ability to view the article as it grows is a key factor in the marketability of the plant. The key focal points for a plant are the lower portion, which contains the root system, and the upper portion, which typically includes the leaves and flowers. Therefore, a device capable of retaining and supporting an article without obstructing the visibility of the article, in particular the lower and upper portion of the article, is often sought after to increase the marketability and display of the article.

Existing devices used to retain and support an article throughout the lifespan of the article continue to fall short in addressing the need to retain and support an article within a vessel without negatively affecting the condition and marketability of the article. Having a support device that retains and supports an article within a vessel, prevents damage to the article, accommodates both article growth and the unpredictable forces, particularly during transportation, and allows maximum visibility of the desirable article portions throughout production, transportation, and display of the article would overcome the aforementioned challenges.

It is an objective of the present disclosure to provide a plug device that rests within and engages with a mouth of a vessel to substantially plug the mouth of the vessel so that an article held within the vessel is supported and is substantially inhibited from splashing above the mouth and spilling out of the vessel.

It is another objective of the present disclosure to provide a plug device that supports an article, so a lower article portion is retained and supported within a vessel, a middle article portion extends through and is supported by a plug channel, and an upper article portion extends through and above the plug channel, to allow maximum visibility of lower article portion and upper article portion.

It is still another objective of the present disclosure to provide a plug device formed by at least two plug pieces, the two plug pieces resting adjacent and contacting each other to form a plug channel that surrounds and supports a middle article portion extending through the plug channel above the mouth without damaging the article. Forming the channel to surround the middle article portion reduces the need to manipulate the article through the channel, which may cause damage to the article. In addition, for certain articles having oblong-shaped or irregularly shaped profiles, like plants for example, the article is unable of being manipulated through a narrow channel without causing damage to a portion of the article. Forming a channel around a middle article portion allows an oblong-shaped or irregularly shaped article, such as a plant, to be supported by the channel without having to manipulate the article through the channel.

It is yet another objective of the present disclosure to provide a plug device defined by at least two plug pieces that contact each other to form a plug body defining a plug channel, and the plug body is configured to (sized, shaped, otherwise capable of) correspond to the size and shape of a mouth of a vessel and to substantially plug the mouth to inhibit an article from cresting above the mouth and spilling out of the vessel, especially during transportation of the article.

It is an objective of the present disclosure to provide a method of supporting a portion of an article, without damaging the article, so that the portion of the article retained within the vessel is substantially inhibited from splashing above the mouth and falling out of the vessel during production, transportation, and display of the article. The method includes the steps of inserting an article into a vessel such that a first article portion is situated inside the vessel and a second article portion extends through and above the mouth of the vessel, positioning a first plug piece into the mouth of the vessel without damaging the article, positioning a second plug piece into the mouth of the vessel without damaging the article to form a plug body comprising a plug channel that surrounds and supports the portion of the article extending through and above the mouth.

Additional features and advantages of the disclosure will be set forth in the description which follows, and in part will be obvious from the description, or may be learned by the practice of the disclosure. The disclosed aspects of the disclosure herein are merely exemplary as the disclosure may be embodied in various forms. Therefore, the disclosure is not limited in its application to the specific structural and functional details disclosed and not the arrangements of the components set forth in the following description or illustrated in the drawings. The disclosure is capable of other embodiments and of being practice and carried out in other ways. As such, those skilled in the art will appreciate that the conception upon which the distinction of the disclosure is based, may readily be utilized as a basis for designing other structures and methods for carrying out the disclosure.

SUMMARY OF THE INVENTION

The aforesaid and other objective are realized by providing a vessel plug supported by and resting within a mouth of a vessel to substantially plug the mouth of the vessel to inhibit an article from cresting above the mouth and spilling outside the vessel and to retain an article within the vessel without damaging the article or hindering the visibility of the portions of the article extending above and below the vessel plug. The vessel plug includes a first plug piece and a second plug piece, which are positioned adjacent and contacting each other to form a plug body. The plug body is supported by and within the mouth of the vessel such that a portion of the plug body rests extending above the mouth and a portion of the plug body rests extending below the mouth. An indentation is disposed on the periphery of the plug body and is configured to engage with a lip that defines the size and shape of the mouth. A plug channel is formed in the plug body when the first and second pieces are positioned adjacent each other. The plug channel is formed to surround the portion of the article to support a portion of the article upright and to retain a different (i.e., lower) portion of the article below the mouth and inside the vessel.

The vessel plug may surround and support a portion of a plant during production, transportation, and display of the plant within a vessel. The plant typically comprises a root system and a shoots system. The root system of the plant, which may comprise a plurality of roots, is positioned into and retained within the vessel such that a portion of shoots of the plant extend through the plug channel and above the mouth. A portion of the shoots are surrounded and supported by the plug channel throughout the lifespan of the plant, which includes production, transportation, and display of the plant. Because plants require nutrients to grow, the vessel plug is configured to substantially plug the mouth of the vessel, so a nutrient solution placed within the vessel to submerge a portion of the roots of the plant is substantially unable to crest above the mouth of the vessel and spill out of the vessel throughout the lifespan of the plant, especially during the transportation of the plant.

DETAILED DESCRIPTION OF THE PREFERRED EMBODIMENT AND OPERATION OF THE INVENTION

Figure 1:
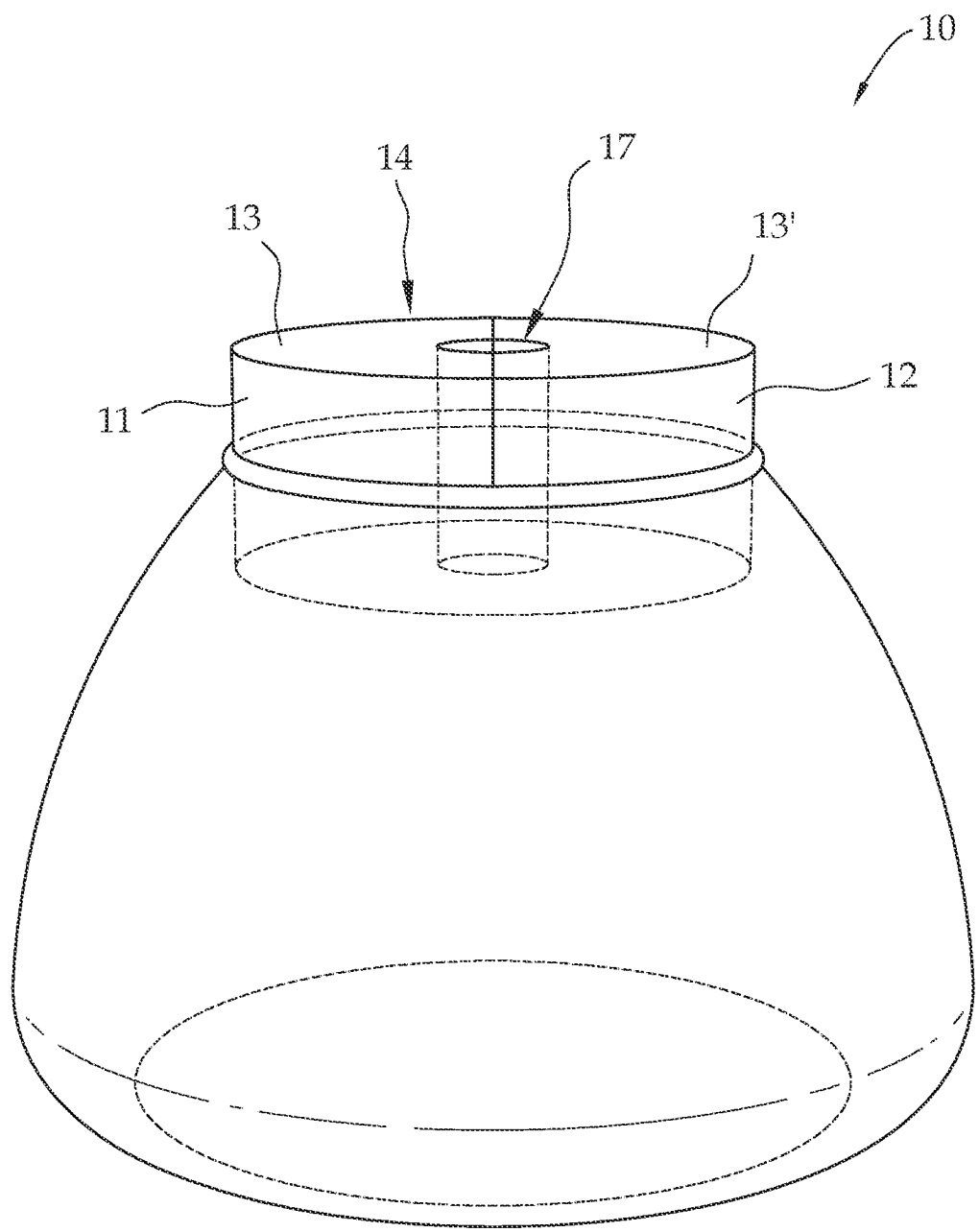
FIG. 1 is a perspective view of a vessel plug supported by and resting within a mouth of a vessel according to an embodiment of the present disclosure.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

The present disclosure is directed to a vessel plug used to substantially plug a mouth of a vessel holding an article and to support a portion of the article. A preferred embodiment of a plug body is formed when a first plug piece and a second plug piece are positioned adjacent each other so that the vessel plug may rest within and be supported by the mouth of the vessel. The size and shape of the mouth may be defined by a lip, which engages a portion of the plug body to secure the vessel plug within the mouth. An indentation is preferably disposed on the periphery of the plug body and is configured to correspond to and engage with the lip to strengthen the engagement between the vessel plug and lip so that the vessel plug may resist unintended removal or displacement. A plug channel is formed in the preferred plug body when the plug pieces are positioned adjacent each other so that the pieces are contacting each other. The plug channel is formed around a middle portion of the article to support the article and to retain a lower portion of the article within the vessel and substantially inhibit the article from splashing above the mouth and falling outside the vessel.

The plug body is ideally configured (i.e., sized, shaped, and otherwise capable) to substantially plug the mouth of the vessel such that the size and shape of the vessel plug corresponds to the size and shape of the mouth of the vessel. The size, shape, and curvature of the plug body and plug channel depends on the size, shape, and curvature of the vessel to be plugged and the article to be supported. Stated differently, the vessel plug may be configured having a circularly shaped plug body to correspond with and substantially plug a circularly shaped mouth. Alternatively, the vessel plug can be configured having a squarely shaped plug body to correspond with and substantially plug a squarely shaped mouth. Additional configurations (i.e., sizes and shapes) of plug bodies and plug channels may exist to serve the same ultimate purpose of corresponding to and engaging with the mouth of a vessel to substantially plug the mouth of a vessel, regardless of the shape or size of the mouth. The size and shape of the plug body, the plug channel, and the mouth of the vessel may be regularly or irregularly shaped, therefore, such alternate shapes should be considered to be within the scope of the present disclosure.

The vessel may be any type of vessel comprising a mouth defined by a lip and a reservoir capable of holding either the article or, in the case of living articles, a nutrient solution. The reservoir is defined by the maximum volume the vessel can retain below the mouth of the vessel. In the preferred embodiment, the vessel is a glass container with a defined reservoir and a single mouth. In other embodiments, the vessel may comprise a plurality of mouths, wherein a plurality of vessel plugs may be used to substantially plug the plurality of mouths.

The first plug piece and second plug piece may be manufactured from a resilient material including, but not limited to: cork; plastic; rubber; acrylic; polypropylene; or cellulose material such as paper, cardboard, or wood. The material used may be natural or synthetic. Those in the art will understand that any material, now known or hereafter developed, may be used in forming the plug body described herein. The plug body may be manufactured in different sizes, shapes, colors, geometries, and/or configurations of colors suitable for purposes described herein. In certain embodiments, especially wherein the vessel retains a liquid solution, the plug pieces may be manufactured of a material having suitable impermeable properties.

The instant vessel plug is easily manufactured and designed to resist unintended removal or displacement from a mouth of a vessel throughout production, transportation, and display of the article. Other aspects of the present disclosure include supporting a portion of an article extending through a plug channel and above the mouth. In embodiments where a nutrient solution is placed into the vessel, it is another aspect of the present disclosure to substantially plug the mouth, so a nutrient solution placed within the vessel to submerge a portion of the roots of a plant is substantially inhibited from cresting above the mouth and spilling outside the vessel. One or more embodiments of the article referenced throughout this disclosure may be segmented into three portions: a lower article portion that is retained below the mouth and within the vessel, a middle article portion that is surrounded and supported within the plug channel, and an upper article portion that extends above the mouth of the vessel. These features, along with others will be understood after reading this disclosure.

Turning now to the figures, FIG. 1 is a perspective view of a preferred embodiment of a vessel plug 10 of the present disclosure comprising a plug body 14 formed by a first plug piece 11 and a second plug piece 12 positioned adjacent each other so that the plug body 14 rests within and is supported by a mouth 31 of a vessel 30 and the mouth 31 of the vessel 30 is substantially plugged. As used herein, the term "substantially plugged" means a plug 10 configured to inhibit contents within the vessel from cresting above the mouth and spilling out of the vessel reducing the size of the mouth 31 opening to the size of a plug channel 17, whereby said contents may otherwise crest above the mouth 31 and spill out of the vessel in the absence of plug 10. The plug channel 17 is formed in the plug body 14 when the plug pieces 11, 12 are positioned adjacent each other. The size and shape of the plug channel 17 corresponds to the size and shape of a middle article portion 52 to be supported. The plug channel 17 may be configured to have dimensions slightly larger than the middle article portion 52 to accommodate any change of size of the article 50, for example, due to article growth. Additionally, or in the alternative, embodiments of plug channel 17 may assume a variety of size(s), shape(s), or geometries as may be desirous to a user, and the same should be considered within the scope of the instant disclosure.

Figure 2:
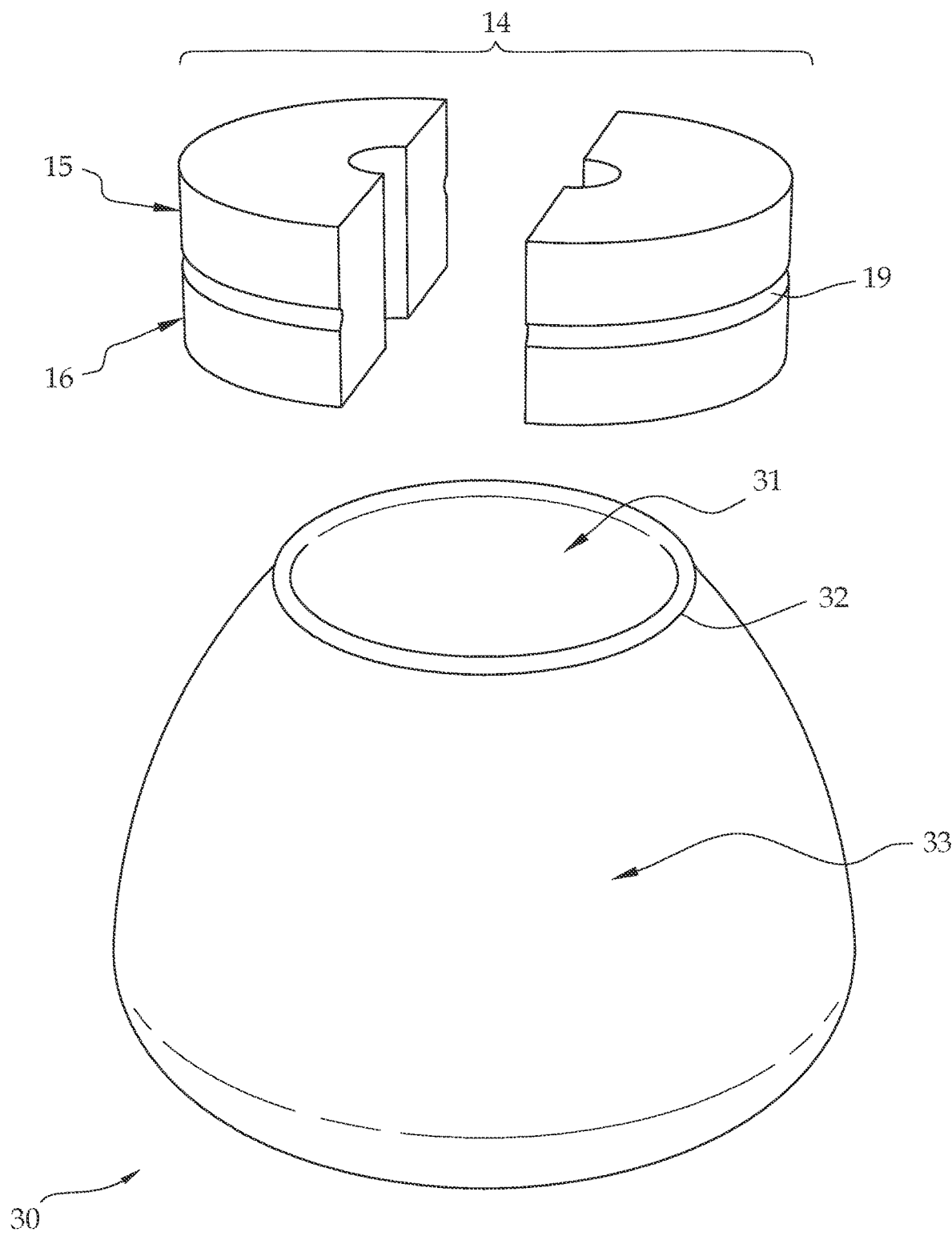
FIG. 2 is an exploded right side elevational view of the vessel plug above a vessel according to an embodiment of the present disclosure.

FIG. 2 is an exploded right side elevational view of one embodiment of the vessel plug of the present disclosure illustrating a vessel 30 comprising a circularly shaped mouth 31 defined by a lip 32. FIG. 2 further illustrates an indentation 19 preferably disposed on the periphery of the plug body 14. The indentation 19 may be configured to correspond to and engage with the lip 32 when the plug pieces 11, 12 are positioned within the mouth 31 of the vessel 30. When the vessel lip 32 engages the indentation 19, upper surfaces 13, 13' of the respective plug pieces 11,12 are preferably coplanar, creating the appearance of a unitary plug body 14, which enhances the aesthetics and value of the article and plug device. When the indentation 19 engages with the lip 32, the vessel plug 10 is held in place and is more likely to remain at a consistent, predetermined position throughout production, transportation, and display of the article, enhancing the aesthetics of displaying multiple articles next to one another. The indentation delineates a top plug body portion 15 that rests extending above the mouth 31 and a bottom plug body portion 16 that rests extending below the mouth 31.

Figure 3:
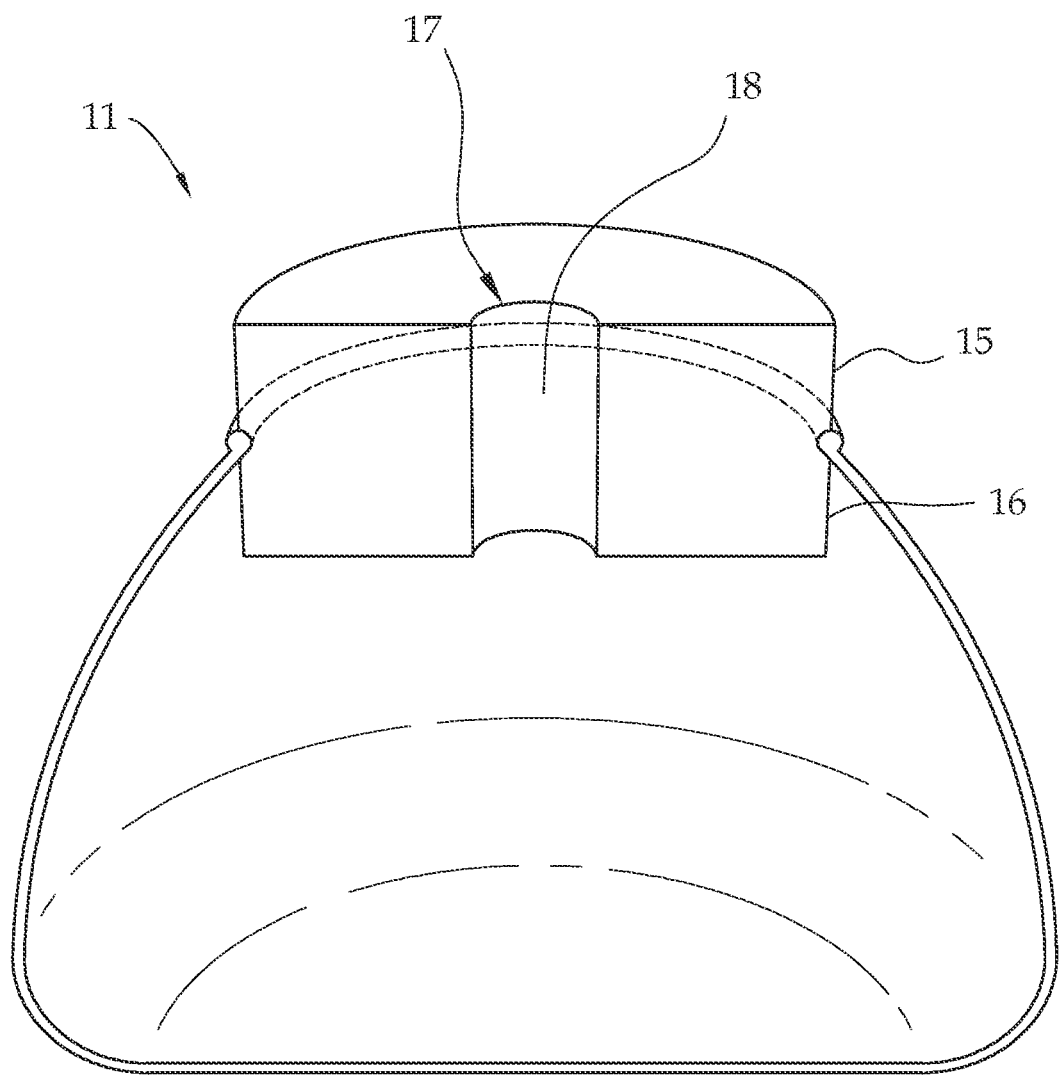
FIG. 3 is a right-side sectional view of a vessel plug supported by and resting within a mouth of a vessel according to an embodiment of the present disclosure.

FIG. 3 is a right-side elevational view of one embodiment of the vessel plug of the present disclosure illustrating the vessel plug 10 supported by and resting within a circularly shaped mouth 31 of a vessel 30 so that a top plug body portion 15 may extend above the mouth 31 and a bottom plug body portion 16 may extend above below the mouth 31. The circularly shaped mouth 31 is defined by a circularly shaped vessel lip 32. FIG. 3 illustrates the corresponding nature of the preferred indentation 19 and vessel lip 32 when the vessel plug 10 is positioned within the mouth 31 of the vessel 30 such that the lip 32 nestles into and engages the indentation 19 to secure the plug body 14 within the mouth 31 so that the vessel plug 10 may resist unintended removal or displacement. When the plug 10 is securely positioned within the mouth 31 such that the lip 32 is nestled into the indentation 19, upper surfaces of the plug pieces 13, 13' may rest flush, or ideally coplanar, enhancing the aesthetics the of article by providing a seemingly unitary plug at a consistent, predetermined position throughout production, transportation, and display of the article.

Figure 4:
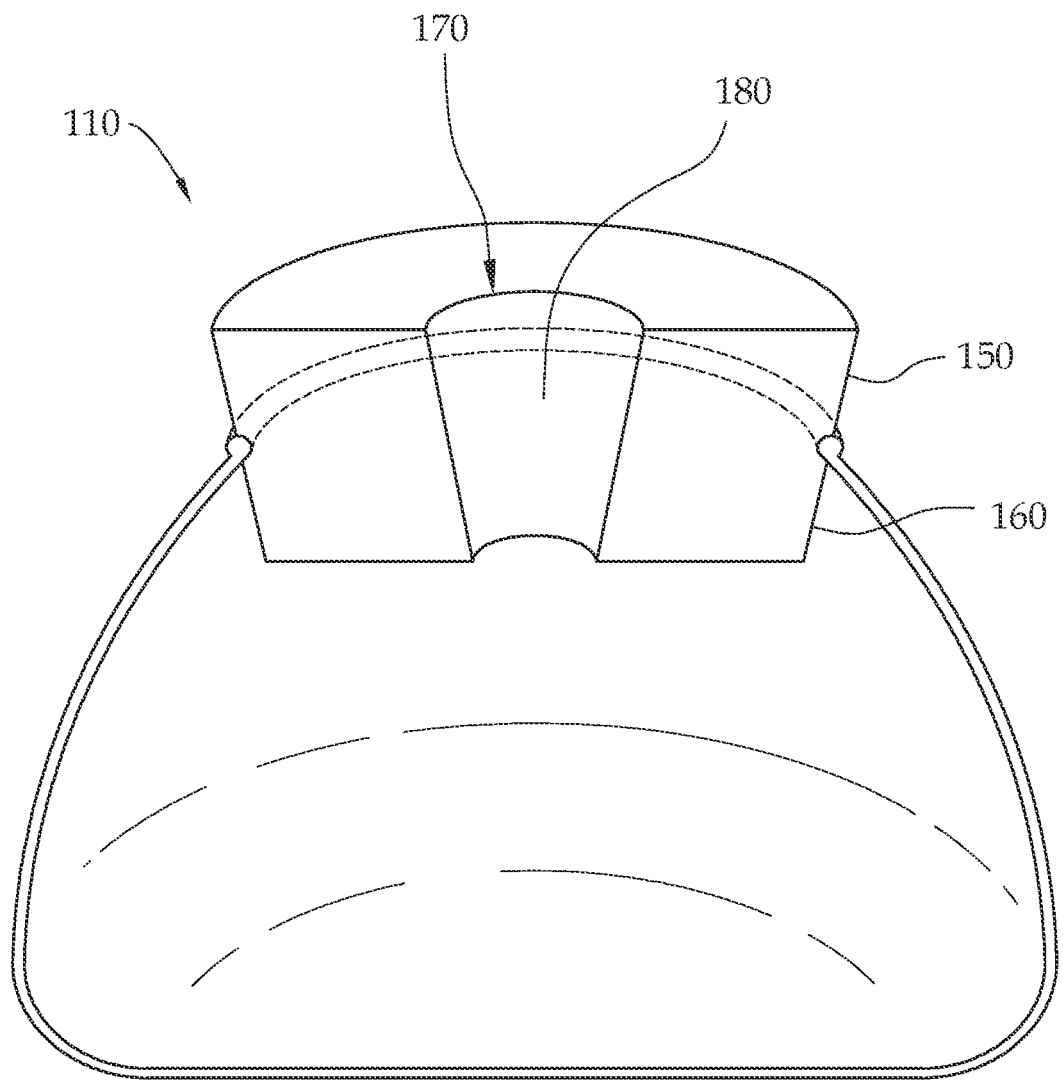
FIG. 4 is a right-side sectional view of a vessel plug configured with a tapered plug body supported by and resting within a mouth of a vessel according to an embodiment of the present disclosure.

FIG. 4 is a right-side elevational view of an embodiment of the vessel plug of the present disclosure illustrating a tapered plug body 140 resting and secured within the mouth 31 of the vessel 30. The tapered plug body 140 provides a unique aspect without affecting the operation and objectives of the invention. When the plug body 140 is engaged with the lip 32, the indentation 190 disposed on the periphery of the plug body 140 tends to cause the upper surface 130 of each plug piece 110 (second plug piece is not shown) to rest on a single plane, making the two-piece vessel plug 100 appear as a single unitary piece. A tapered plug body 140 also reduces the overall volume the bottom plug body portion 160 fills within the vessel 30, in turn requiring less material to manufacture and increasing the available volume of the reservoir 33 of the vessel 30. In addition, a tapered plug body 140 having a tapered bottom plug body portion 160 resting and extending below the mouth 31 of the vessel 30 may further inhibit an article 50, such as a nutrient solution 54, from cresting above the mouth 31 and spilling outside the vessel 30.

The plug channel 17 may also be configured to form any shape or size. Channel sidewalls 18 may be tapered or straight. The plug pieces 11, 12 shown in FIG. 3 (only showing the first plug piece 11) are configured to form a straight plug channel 17 having straight channel sidewalls 18. The plug pieces 110, 120 shown in FIG. 4 (only showing the first plug piece 11) are configured to form a tapered plug channel 170 having tapered channel sidewalls 180.

Figure 5A:
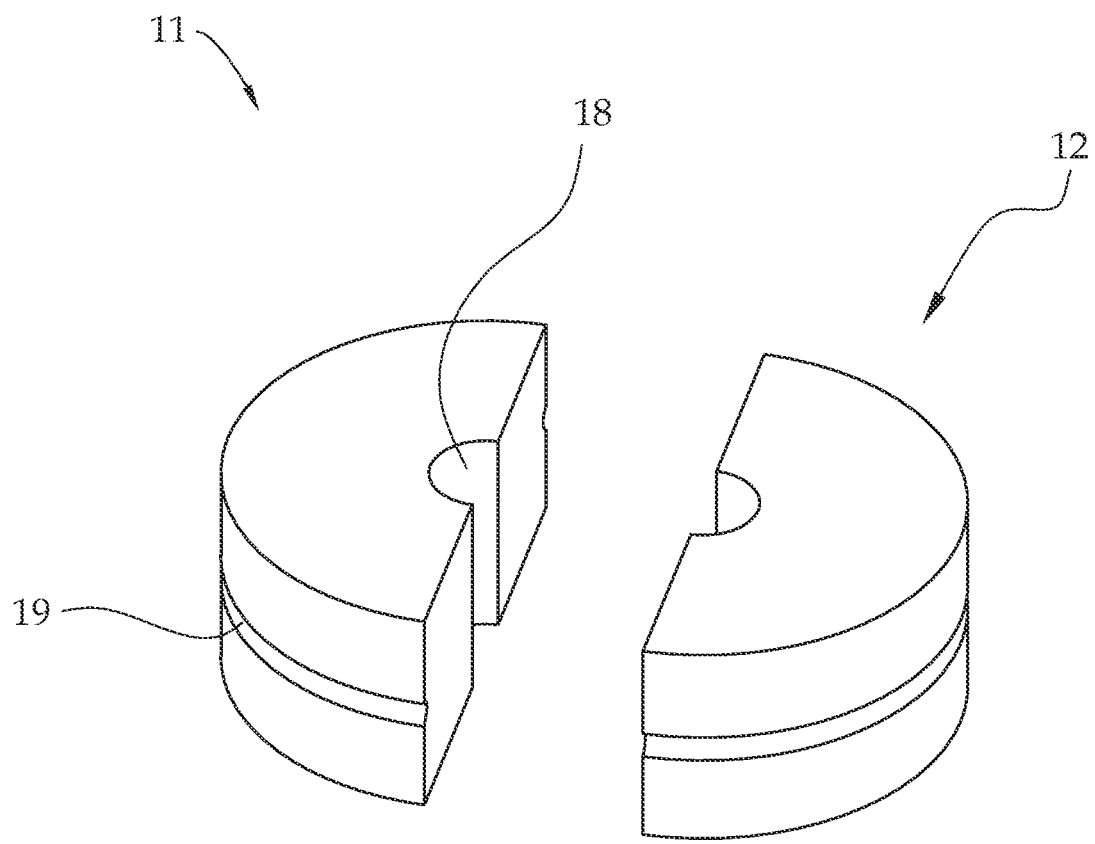
FIG. 5A is an exploded perspective view of the vessel plug configured with similarly shaped and sized pieces that may be supported by and rest within a circular-shaped mouth according to an embodiment of the present disclosure.
Figure 5B:
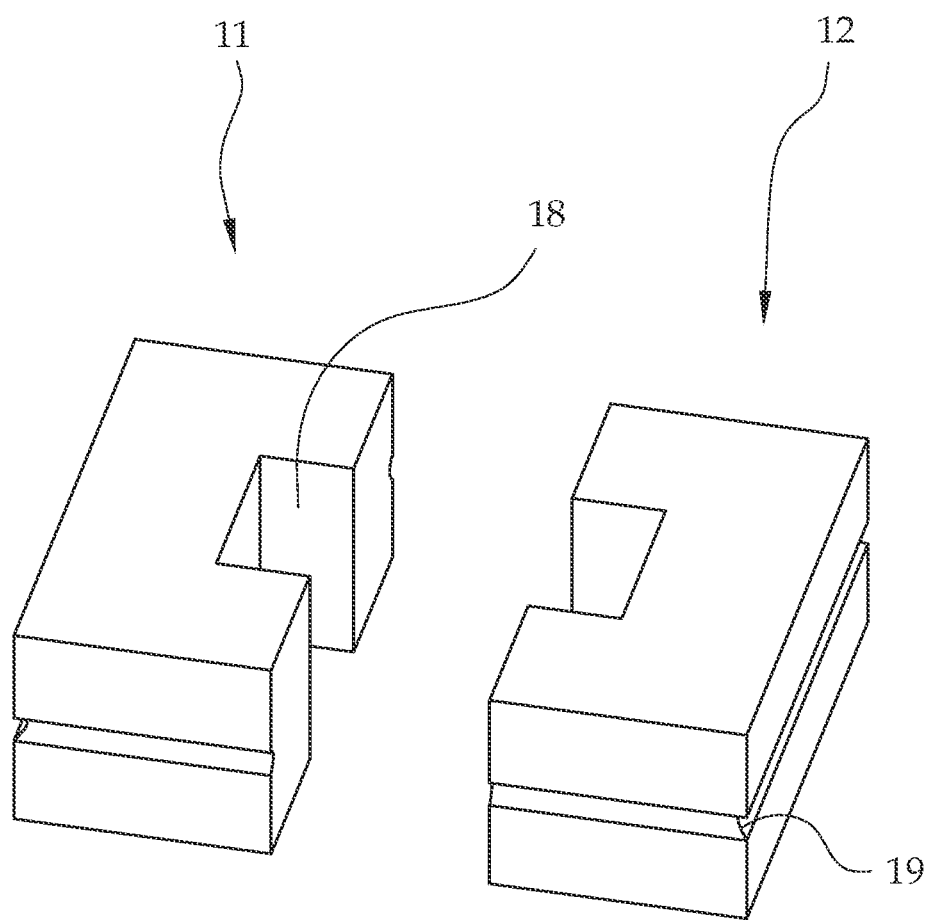
FIG. 5B is an exploded perspective view of the vessel plug configured with similarly shaped and sized pieces that may be supported by and rest within a rectangular-shaped mouth according to an embodiment of the present disclosure.
Figure 5C:
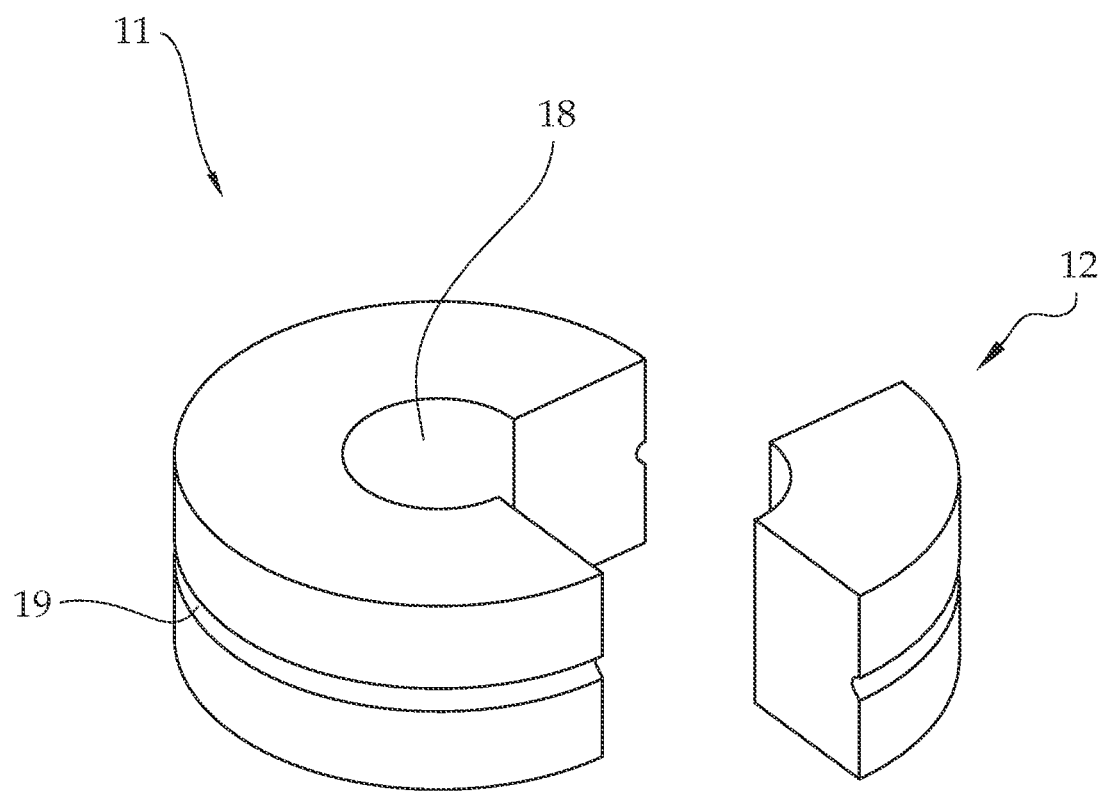
FIG. 5C is an exploded perspective view of the vessel plug configured with differently shaped and sized pieces that may be supported by and rest within a mouth of a vessel according to an embodiment of the present disclosure.

FIG. 5A is an exploded perspective view of an embodiment of the vessel plug of the present disclosure illustrating a vessel plug 10 configured with two similarly shaped and sized plug pieces 11, 12 that contact each other to form a plug body 14 that can securely rest within and substantially plug a circularly shaped mouth 31. FIG. 5B is an exploded perspective view of an alternative embodiment of the vessel plug of the present disclosure showing a vessel plug 210 configured with two similarly shaped and sized plug pieces 211, 212 that contact each other to form a plug body 214 that can securely rest within and substantially plug a squarely shaped mouth 31. FIG. 5C is an exploded perspective view of an alternative embodiment of the vessel plug of the present disclosure illustrating a vessel plug 310 configured with two dissimilarly shaped and sized plug pieces 311, 312 that contact each other to form a plug body 314 that can securely rest within and substantially plug a circularly shaped mouth 31. It should be understood that the plug body can be configured to correspond to and substantially plug a vessel mouth of any shape or size.

Figure 6:
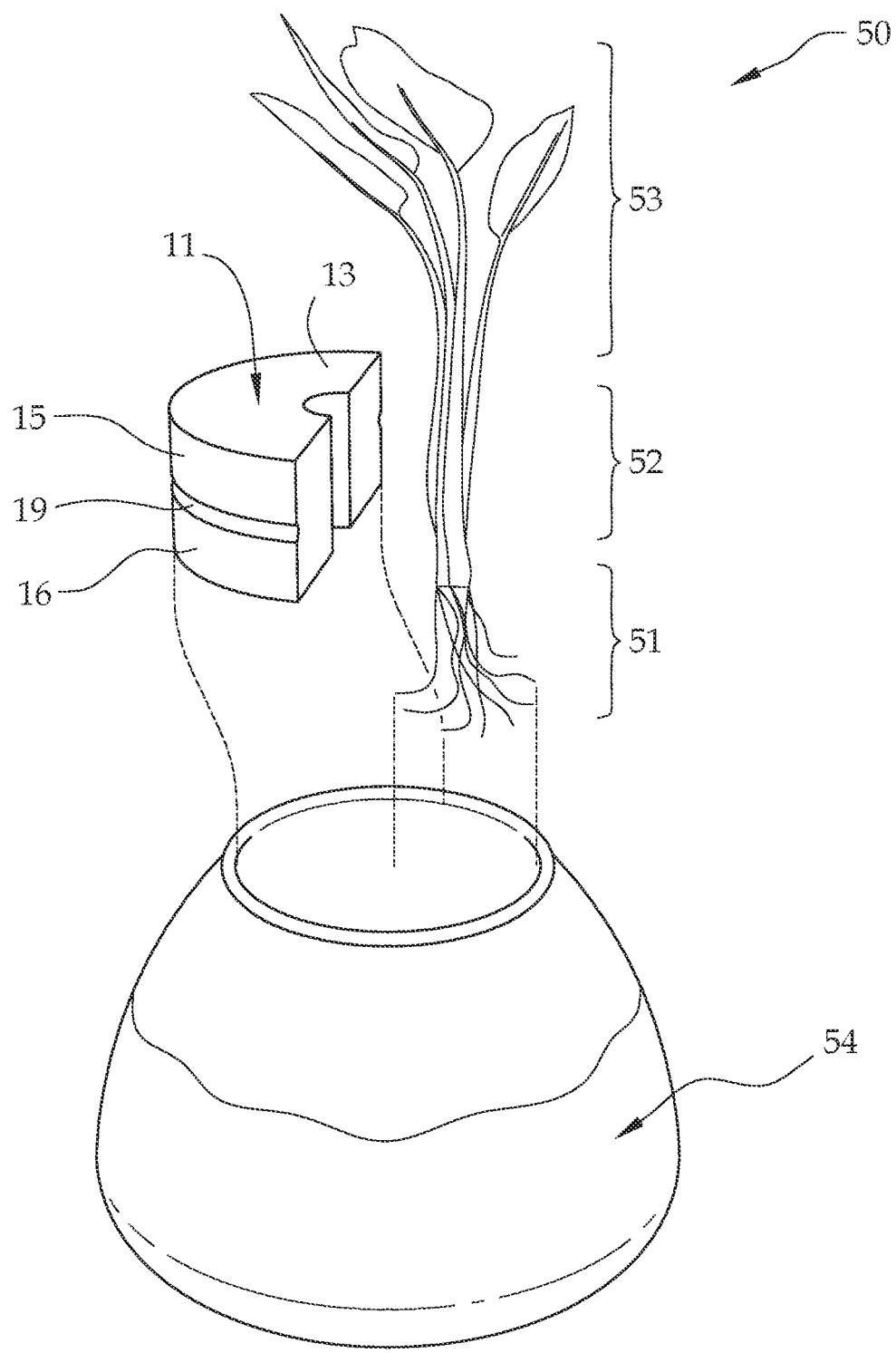
FIG. 6 is an exploded perspective view of a first plug piece and an article situated above a vessel holding a nutrient solution according to an embodiment of the present disclosure.

FIG. 6 is an exploded perspective view of one embodiment of a first plug piece 11 and a plant 50 situated above a vessel 30 holding a nutrient solution 54. The plant has a root system, which defines the lower article portion 51, and a shoot system, which includes both the middle article portion 52 and the upper article portion 53. The shoot system extends through the plug channel 17 above the mouth 31 so that the middle plant portion 52 is surrounded and supported by the plug channel 17 and an upper plant portion 53 extends above the plug body 14. The root system is retained within the vessel 30, below the plug body 14, such that the lower plant portion 51 is at least partially submerged in the nutrient solution 54. The plug channel 17 is configured (i.e., sized, shaped, and otherwise capable) to accommodate plant growth, which may increase the overall size of the middle plant portion 52 surrounded and supported by the plug channel 17. In other words, the plug channel 17 may have a diameter that is slightly larger than the middle article portion 52 (or bunched together articles) to be supported by the plug channel 17 to accommodate article growth.

Figure 7:
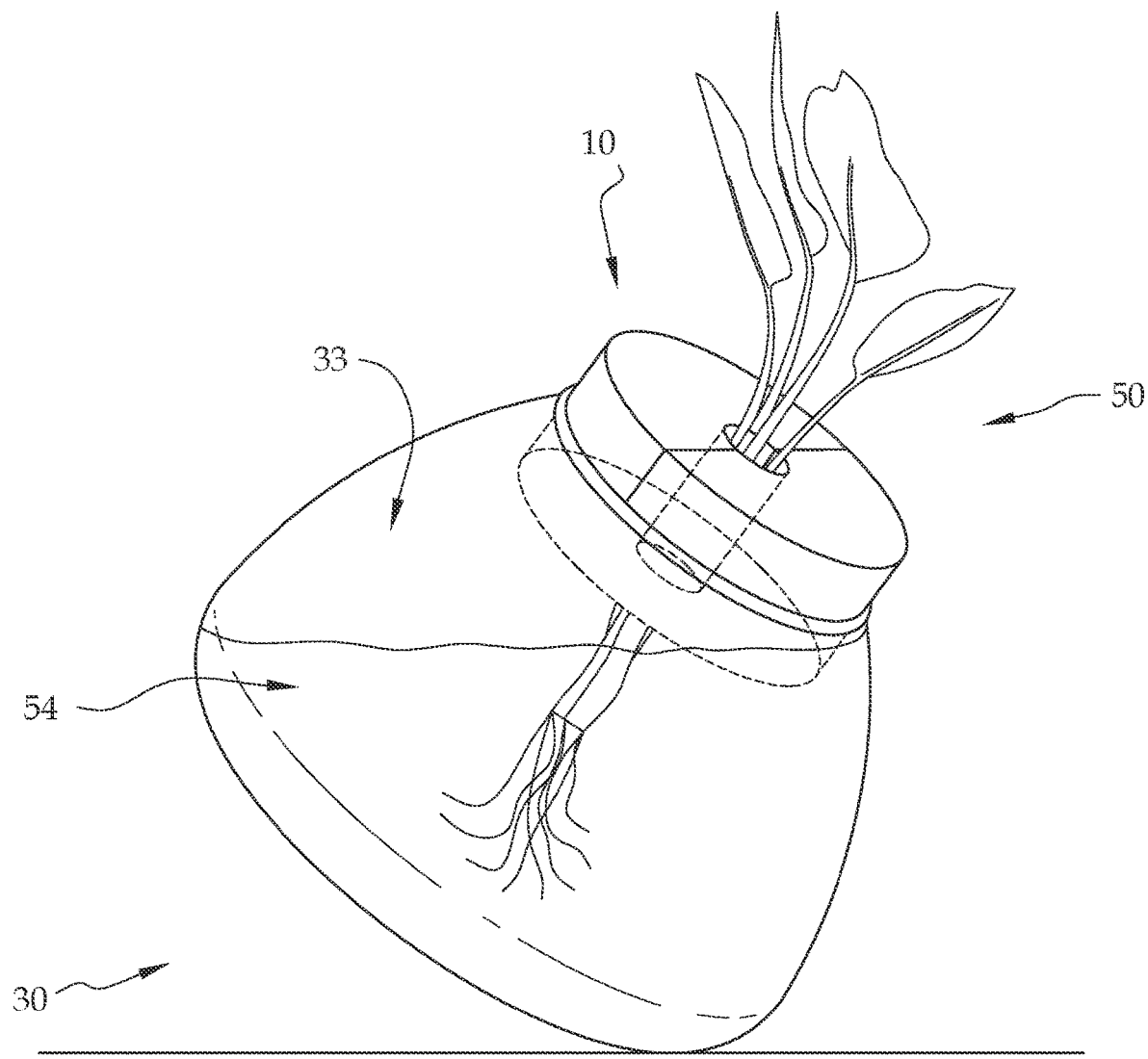
FIG. 7 is a right-side elevational view of a vessel plug substantially plugging the mouth of a tipped vessel and substantially retaining the nutrient solution below the mouth by inhibiting the nutrient solution from cresting above the mouth and spilling outside the vessel.

FIG. 7 is a right-side elevational view of one embodiment of a vessel plug of the present disclosure illustrating the ability of the plug device 10 to substantially plug the mouth 31 of the vessel 30 and allow the shoot system of the plant to extend through the plug channel 17 and above the mouth 31 and plug body 14. As the vessel 30 holding nutrient solution 54 is tipped over, or experiences unpredictable forces during transportation, the lower article portion 51 and the nutrient solution 54 are substantially inhibited from cresting above the mouth 31 and spilling outside the vessel 30. When the vessel plug 10 is securely resting within the mouth 31, the overall size of the mouth 51 opening is reduced to the size of the plug channel 17, in turn, limiting the amount of article 50, 54 loss or spillage, which may occur when the vessel 30 is not substantially plugged and tipped over or subjected to unexpected or unpredictable forces.

The present disclosure also includes a method of using a vessel plug to surround and support a middle article portion and substantially plug the mouth of a vessel to retain a lower portion of the article below the mouth, without damaging the article. The method comprises the steps of inserting an article within a vessel so that a lower portion of the article is situated below the mouth, within the vessel, and an upper portion extends above the mouth, positioning a first plug piece within the mouth so that the first plug piece securely rests within the mouth of the vessel, positioning a second plug piece within a mouth to form a plug body that substantially plugs the mouth of the vessel and to form a plug channel that surrounds and supports a middle portion of the article extending through the plug channel.

Alternatively, the instant disclosure may also be used to surround and support a middle portion of a plurality of articles extending through the mouth. In this situation, the method further includes bunching together multiple articles and positioning the first and second plug piece within the mouth to define a plug body that substantially plugs the mouth and to form a plug channel that surrounds and supports the middle portion of the bunched together articles extending through the plug channel.

The presenting invention may be used at any time of the lifespan of the article, whether that is production, transportation, or display of the article. In certain situations, the vessel plug may be used in combination with a hydroponic plant vessel to substantially plug and thereby substantially retain a portion of the plant, as well as any nutrient solution, within the vessel, below the mouth.

In the drawings and specification there has been set forth preferred or exemplary embodiments of the invention, and although specific terms have been employed, they are used in a generic and descriptive sense only and not for purposes of limitation, the scope of the invention being defined in the claims.

I claim:

1. A plug device in combination with a vessel holding an article, the combination comprising:
 a vessel for holding an article, the vessel including a mouth defined by a lip; and
 a plug device for substantially plugging the mouth and for supporting a middle article portion, the plug device further including, a plug body defined by at least a first plug piece and second plug piece resting adjacent each other,
  wherein the plug body further comprises an indentation disposed around a periphery of the plug body,
  wherein the first plug piece and the second plug piece form a plug channel through the plug body, and
  wherein the plug device is made of cork material.

2. The combination of claim 1, wherein the indentation is configured to engage the lip of the vessel.

3. The combination of claim 1, wherein the plug body further comprises a bottom plug body portion that securely rests extending below the mouth and a top plug body portion that securely rests extending above the mouth.

4. The combination of claim 1, wherein the plug body is tapered.

5. The combination of claim 1, wherein the first and second plug piece are identical.

6. The combination in claim 1, wherein the first plug piece and second plug piece are arcuate shaped.

7. A plug device in combination with a vessel holding an article, the combination comprising:
 a vessel for holding an article, the vessel including a mouth defined by a lip; and
 a plug device for substantially plugging the mouth and for supporting a middle article portion, the plug device further including, a plug body defined by at least a first plug piece and second plug piece resting adjacent each other,
  wherein the plug body further comprises an indentation disposed around a periphery of the plug body,
  wherein the first plug piece and the second plug piece form a plug channel through the plug body, and
  wherein the plug body is tapered.

8. The combination of claim 7, wherein the indentation is configured to engage the lip of the vessel.

9. The combination of claim 7, wherein the plug body further comprises a bottom plug body portion that securely rests extending below the mouth and a top plug body portion that securely rests extending above the mouth.

10. The combination of claim 7, wherein the plug device is made of cork material.

11. The combination of claim 7, wherein the first and second plug piece are identical.

12. The combination in claim 7, wherein the first plug piece and second plug piece are arcuate shaped.

* * * * *